(12) United States Patent
Backhouse et al.

(10) Patent No.: US 11,413,831 B2
(45) Date of Patent: Aug. 16, 2022

(54) TOOL FOR COMPACTING A COMPOSITE PREFORM ASSEMBLY AND A METHOD FOR THE SAME

(71) Applicant: ROLLS-ROYCE plc, London (GB)

(72) Inventors: Robert C. Backhouse, Wells (GB); Christopher D. Jones, Bristol (GB)

(73) Assignee: Rolls-Royce plc

( * ) Notice: Subject to any disclaimer, the term of this patent is extended or adjusted under 35 U.S.C. 154(b) by 121 days.

(21) Appl. No.: 17/021,415

(22) Filed: Sep. 15, 2020

(65) Prior Publication Data

US 2021/0162683 A1   Jun. 3, 2021

(30) Foreign Application Priority Data

Sep. 17, 2019 (GB) ...................................... 1913393

(51) Int. Cl.
*B29C 70/46* (2006.01)
*B29C 43/10* (2006.01)
*B29L 31/00* (2006.01)

(52) U.S. Cl.
CPC ............ *B29C 70/462* (2013.01); *B29C 43/10* (2013.01); *B29C 2043/108* (2013.01); *B29L 2031/7504* (2013.01)

(58) Field of Classification Search
CPC .. B29C 70/462; B29C 43/10; B29C 2043/108
See application file for complete search history.

(56) References Cited

U.S. PATENT DOCUMENTS

| | | | |
|---|---|---|---|
| 3,532,438 | A | 10/1970 | Palfreyman et al. |
| 5,686,038 | A | 11/1997 | Christensen et al. |
| 6,196,794 | B1 | 3/2001 | Matsumoto |
| 6,413,074 | B1 | 7/2002 | Hays |
| 9,050,757 | B1 * | 6/2015 | Boone ..................... B29C 70/44 |
| 2009/0014926 | A1 | 1/2009 | Marini |
| 2010/0322763 | A1 | 12/2010 | Penalver Castro et al. |

(Continued)

FOREIGN PATENT DOCUMENTS

| | | |
|---|---|---|
| CN | 110341212 | 10/2019 |
| EP | 0446851 | 9/1991 |

(Continued)

OTHER PUBLICATIONS

Great Britain search report dated Feb. 27, 2020, issued in GB Patent Application No. 1913392.5.

(Continued)

*Primary Examiner* — Galen H Hauth
(74) *Attorney, Agent, or Firm* — Barnes & Thornburg LLP

(57) ABSTRACT

Tool arrangement for compacting a composite preform assembly comprising a support structure preform and an array of component preforms each extending from the support structure preform and spaced apart along the support structure preform. The tool arrangement comprises a support tool defining a lay-up surface for laying up the support structure preform; a plurality of component moulds, each component mould comprising a pair of blocks configured to cooperate with one another to receive and compact a respective component preform extending from the support structure therebetween, each block having a compaction surface for engaging the component preform and a driving surface.

20 Claims, 10 Drawing Sheets

(56) References Cited

U.S. PATENT DOCUMENTS

| | | | |
|---|---|---|---|
| 2013/0011269 A1* | 1/2013 | Gainnozzi | B29D 99/0028 416/223 R |
| 2013/0156594 A1 | 6/2013 | Kray et al. | |
| 2013/0299672 A1* | 11/2013 | Perrier | B29C 70/48 249/114.1 |
| 2015/0226071 A1 | 8/2015 | Marshall et al. | |
| 2015/0354597 A1 | 12/2015 | I | |
| 2016/0009003 A1* | 1/2016 | Chauvin | B29C 70/462 425/542 |
| 2016/0193792 A1* | 7/2016 | Calisch | B29C 70/541 264/511 |
| 2016/0245103 A1 | 8/2016 | Gimat et al. | |
| 2017/0361512 A1 | 12/2017 | Plante et al. | |
| 2018/0163552 A1 | 6/2018 | Reynolds et al. | |

FOREIGN PATENT DOCUMENTS

| | | |
|---|---|---|
| EP | 1215183 | 6/2002 |
| EP | 2105579 A2 | 9/2009 |
| EP | 2572825 | 3/2013 |
| EP | 2706240 | 3/2014 |
| EP | 3081760 A1 | 10/2016 |
| EP | 3564498 | 6/2019 |
| GB | 1170592 | 11/1969 |
| JP | 201199346 | 5/2011 |
| JP | 2017207016 A | 11/2017 |
| WO | 2010130879 | 11/2010 |
| WO | 2012153039 A1 | 11/2012 |
| WO | 2013133875 | 9/2013 |
| WO | 2015041963 A1 | 3/2015 |

OTHER PUBLICATIONS

Great Britain search report dated Mar. 5, 2020, issued in GB Patent Application No. 1913393.3.
Great Britain search report dated Feb. 19, 2020, issued in GB Patent Application No. 1913394.1.
European search report dated Jan. 22, 2021, issued in EP Patent Application No. EP20192320.
European search report dated Jan. 15, 2021, issued in EP Patent Application No. EP20192316.
European search report dated Jan. 19, 2021, issued in EP Patent Application No. EP20192319.

\* cited by examiner

TOOL FOR COMPACTING A COMPOSITE PREFORM ASSEMBLY AND A METHOD FOR THE SAME

CROSS-REFERENCE TO RELATED APPLICATIONS

This specification is based upon and claims the benefit of priority from UK Patent Application Number 1913393.3 filed on 17 Sep. 2019, the entire contents of which are incorporated herein by reference.

BACKGROUND

Technical Field

The present disclosure relates to a tool arrangement for compacting a composite preform assembly comprising a support structure preform and an array of component preforms each extending from the support structure preform and spaced apart along the support structure preform.

Description of the Related Art

Manufacturing of complex composite products, such as a stator vane ring for a gas turbine engine, typically involves laying up and consolidating component parts individually, and subsequently connecting component parts after consolidation together. However, this increases the part count and manufacturing complexity for the complex product, such as the gas turbine engine, which increases costs during manufacturing.

SUMMARY

According to a first aspect there is provided a tool arrangement for compacting a composite preform assembly comprising a support structure preform and an array of component preforms each extending from the support structure preform and spaced apart along the support structure preform, the tool arrangement comprising: a support tool defining a lay-up surface for laying up the support structure preform; a plurality of component moulds, each component mould comprising a pair of blocks configured to cooperate with one another to receive and compact a respective component preform extending from the support structure therebetween, each block having a compaction surface for engaging the component preform and a driving surface, wherein the component moulds are arranged along the support tool so that a plurality of wedge cavities are defined between non-parallel driving surfaces of adjacent component moulds; and a plurality of wedges configured to be received in the wedge cavities and to cooperate with the respective driving surfaces of the component moulds to drive the adjacent blocks to compact respective component preforms.

The tool arrangement and method of compaction of a composite preform assembly can be used to form an integral component from a plurality of parts, and the tool arrangement relies on gravity for compaction. Therefore it does not require additional fastenings to attach parts of a tool arrangement together, and it does not require an additional dynamic force for compaction of a preform in the tool arrangement. This makes forming an integral component from a plurality of parts simpler.

The tool arrangement may comprise an enclosure configured to be placed over the plurality of component moulds and the plurality of wedges, to further compact the component preforms.

The wedges may comprise a first material and the enclosure may comprise a different second material, and the first material may have a higher coefficient of thermal expansion than the second material. When the tool is heated, the differing coefficient of thermal expansion results in differential thermal expansion between the wedges and the enclosure, which may further compact the preform.

The enclosure may be configured to be placed over the plurality of component moulds and wedges and also the support tool for compaction of the support preform between the support tool and the wedges and moulds. This may provide further compaction of the component preforms together and the support structure preform.

The support tool and the component moulds may have cooperating protrusions and recesses for alignment of the component moulds with respect to the support tool.

The tool arrangement may comprise a retaining tool configured to engage at least some of the plurality of wedges to retain the wedges between the moulds.

The support tool may be a mandrel configured for laying up an annular support structure preform. The component moulds may be configured to be circumferentially spaced around the mandrel, to compact each component preform at circumferentially spaced positions around the mandrel.

The mandrel may comprise a first material and the enclosure may comprise a different second material, and wherein the first material may have a higher coefficient of thermal expansion than the second material. When the tool is heated, the differing coefficient of thermal expansion results in differential thermal expansion between the mandrel and the enclosure, which may further compact the preform.

The first material may comprise aluminium, and the second material may comprise steel.

The component moulds and the wedges may be configured to define a radially outer lay-up surface when assembled together around the mandrel, the outer lay-up surface having an annular profile for laying up an outer annulus preform.

The tool arrangement may comprise an outer assembly configured to cooperate with an inner assembly comprising the mandrel, the plurality of wedges and the plurality of component moulds. The outer assembly may comprise a semi-annular segment configured to oppose the outer lay-up surface to compact an outer annulus preform laid-up on the outer lay-up surface.

Semi-annular is intended to mean at least partially annular, which can include a fully annular segment.

The outer assembly may further comprise two cooperating side plates which are configured to sandwich the inner assembly. The side plates may promote compaction of the wedges against the component moulds.

At least one of the side plates may define a flange lay-up surface contiguous with the outer lay-up surface for laying up an outer annulus pre-form comprising a flange. The side plates may be configured to sandwich the semi-annular segment, so as to compact the flange in the outer annulus preform against the semi-annular segment.

The outer assembly may comprise a draft angle with respect to a longitudinal axis of the mandrel, and the enclosure may comprise a corresponding draft angle which is configured to cooperate with draft angle of the outer assembly so as to provide further compaction to the preforms.

One, or both of the side plates, and the component moulds may comprise cooperating protrusions and recesses for alignment of the moulds with respect to the side plates.

According to a second aspect, there is provided a kit of parts for assembling a tool arrangement in accordance with the first aspect.

According to a third aspect, there is provided a method of compaction of a composite preform assembly comprising a support structure preform and an array of component preforms each extending from the support structure preform and spaced apart along the support structure preform and using a tool arrangement in accordance with the first aspect, the method comprising: laying up a support structure preform on the support tool; laying up a plurality of component preforms in respective component moulds; arranging the moulds in spaced arrangement along the support structure preform such that the component preforms extend from the support structure preform, and to define the plurality of wedge cavities between non-parallel driving surfaces of adjacent component moulds; and driving a wedge into each wedge cavity between respective pairs of component moulds to compact the component preforms in the moulds.

The method may comprise laying up an outer annulus preform on a radially outer lay-up surface defined by the wedges and the component moulds, after driving the wedges into the wedge cavities.

The method may comprise driving semi-annular segments of an outer assembly towards the outer lay-up surface, to compact the outer annulus preform.

The method may comprise arranging an inner assembly comprising the support tool, the component moulds and the wedges in between a pair of side plates of the outer assembly.

The method may comprising placing an enclosure around at least the inner assembly to further compact the component preforms, and the support structure preform.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

Aspects and embodiments of the present disclosure will now be discussed with reference to the accompanying figures. Further aspects and embodiments will be apparent to those skilled in the art.

DETAILED DESCRIPTION

Figure 1:
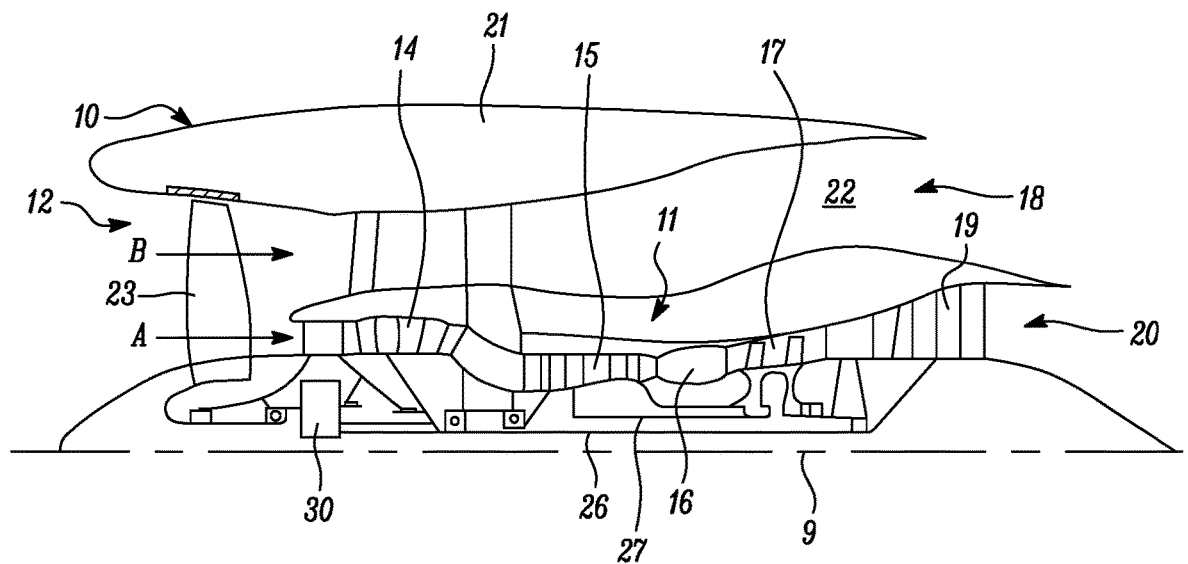
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
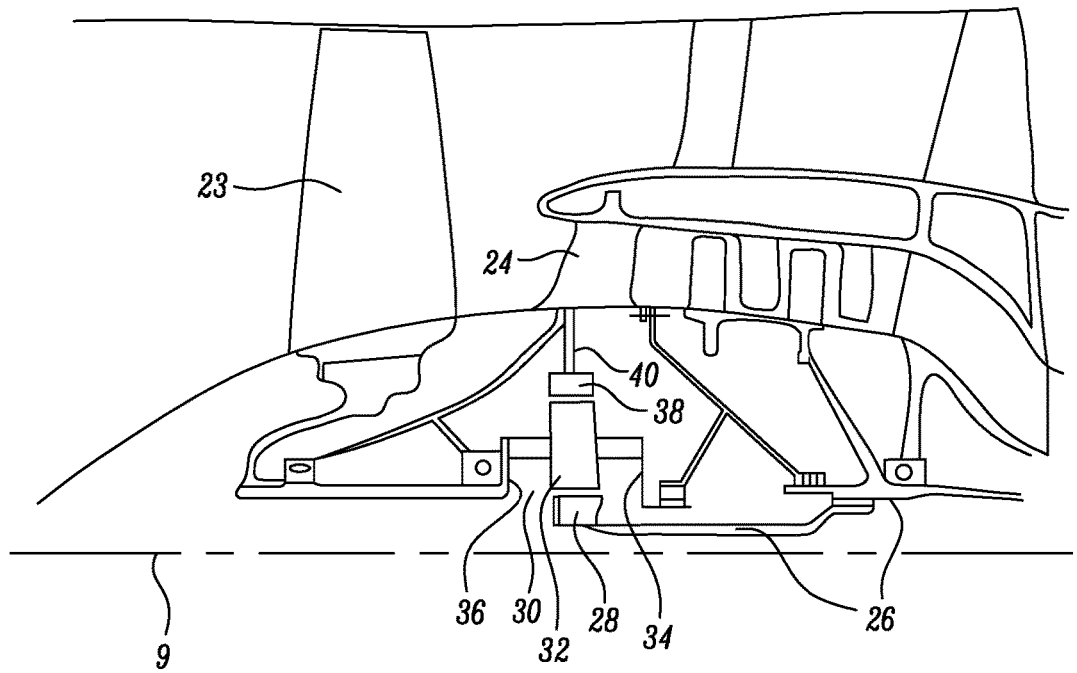
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
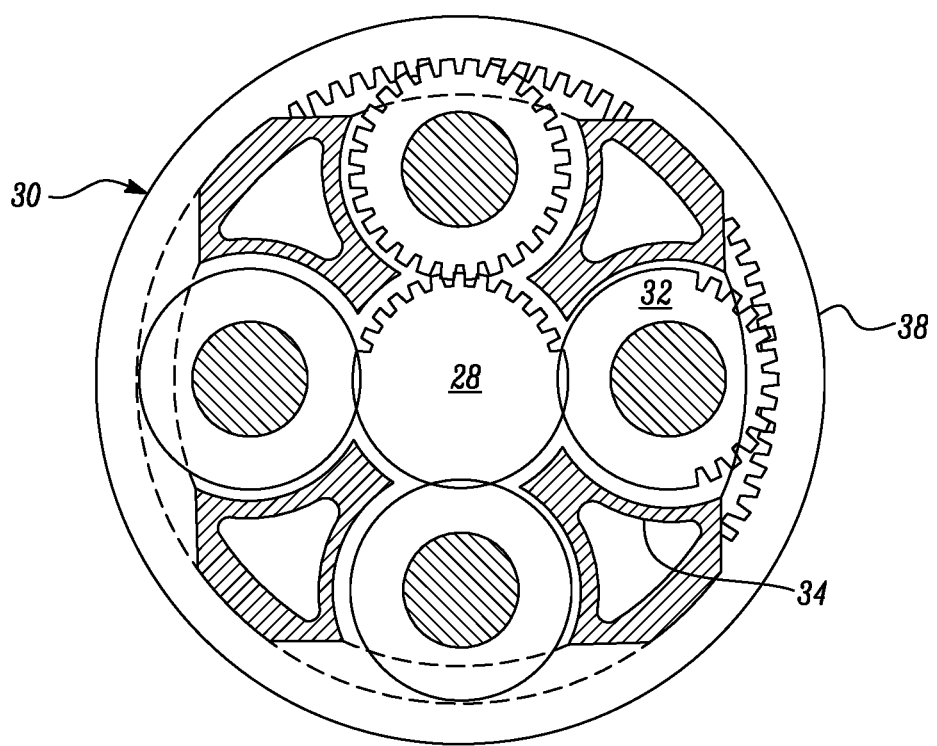
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
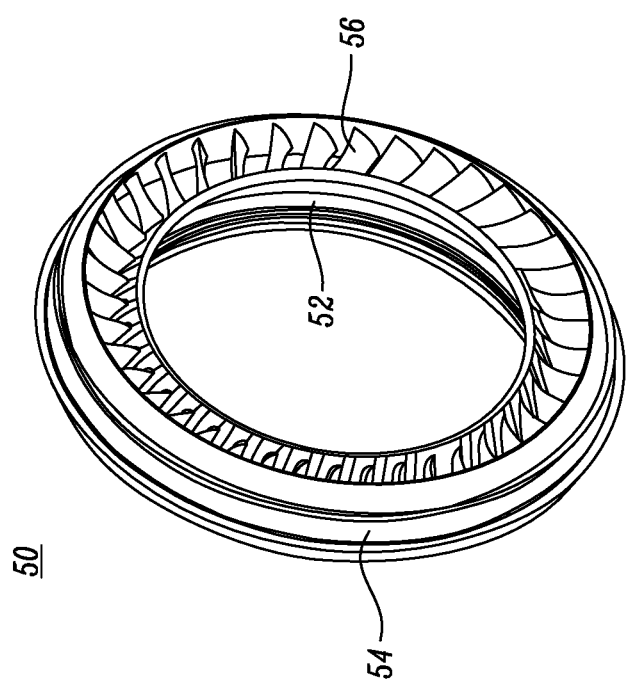
FIG. 4 schematically shows a perspective view of a composite stator vane ring.

FIG. 4 shows a fibre reinforced composite stator vane ring 50, also known as an engine stator section (ESS). The ESS 50 is disposed behind (i.e. downstream of) the fan 23, and is configured to provide a structural load path across the engine core 11 annulus (i.e. between a radially inner structure of the core 11 and the core fairing). Such loads may then be transmitted from the core fairing to the nacelle 21 by a load path across the bypass duct 22, such as the outlet guide vanes (OGVs). The ESS 50 comprises an inner annulus 52, an outer annulus 54 which is concentric with the inner annulus 52, and a plurality of stator vanes 106 disposed between, and attached to, the inner annulus 52 and the outer annulus 54. The plurality of stator vanes 56 are evenly distributed around the circumference of the inner annulus 52 and the outer annulus 54.

In this example, the ESS 50 comprises a fibre reinforced composite material having a three-dimensional (3D) weave, and the stator vanes 56 are integrally formed with the inner annulus 52 and the outer annulus 54. In other examples, the ESS may comprise a woven fibre reinforced composite material having a two-dimensional (2D) weave, or any other suitable form of fibre composite material. In this example, the fibre composite material of the ESS 50 is tri-axial. In some examples, the fibre composite material may be uni-axial or bi-axial.

Figure 5:
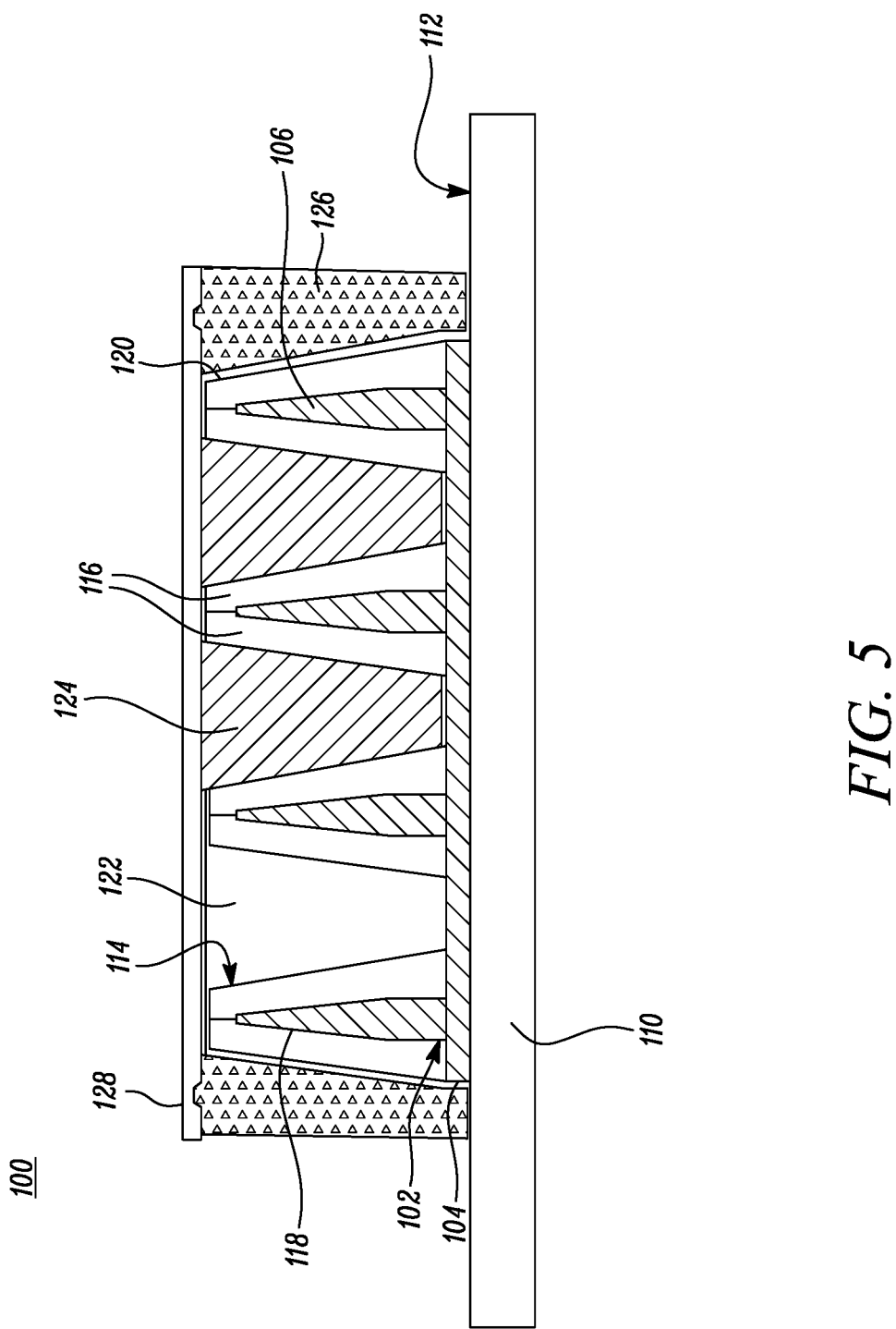
FIG. 5 schematically shows a cross-sectional view of a first example tool arrangement.

FIG. 5 shows a cross-sectional view of a first example tool arrangement 100 for laying-up and compacting a fibre reinforced composite preform assembly 102 comprising a support structure preform 104 and an array of component preforms 106, each extending from the support structure preform 104 and spaced apart along the support structure preform 104. The composite preforms 104, 106 in this example comprise pre-impregnated fibre reinforcement material. In other examples, the composite preforms may comprise dry fibre reinforcement material.

In this example, the component preforms 106 are all identical. In other examples, the component preforms may be any suitable shape, and in some examples, at least some of the components preforms may differ from one another.

The tool arrangement 100 comprises a support tool 110 which defines a lay-up surface 112 for laying-up the support structure preform 104. In this example, the lay-up surface is planar. In other examples, the lay-up surface may be annular, as shown with reference to FIGS. 6-9 below, or the lay-up surface may have any other suitable profile.

The tool arrangement 100 further comprises a plurality of component moulds 114 which are each configured to mould a respective component preform 106. Each component mould 114 comprises a pair of blocks 116 which are configured to cooperate with one another to receive a component preform 106 therebetween, and to compact the component preform 106. Each block 116 comprises a compaction surface 118 for engaging the component preform 106 and a driving surface 120, which is on an opposing, external surface of the block 116.

The component moulds 114 are arranged along the support tool 110 such that the component preforms 106 extend from the support structure preform 104 in an array, and so that a plurality of wedge cavities 122 are formed between adjacent component moulds 114. The driving surfaces 120 of adjacent component moulds 114 are non-parallel so as to define a draft angle with respect to a normal axis of the support tool 110 (i.e. an axis perpendicular to the lay-up surface).

In this example, the draft angle of the driving surface 120 of the blocks is 5 degrees. In other examples, the draft angle may be more or less than 5 degrees, such as 1 degree, 3 degrees, 7 degrees etc.

The tool arrangement 100 further comprises a plurality of wedges 124. The wedges 124 are configured to be received in the wedge cavities 122. The wedges 124 are configured to cooperate with the driving surfaces 120 of component moulds 114 to drive adjacent blocks 116 to compact respective component preforms 106. The wedges 124 comprise external surfaces with corresponding draft angles to the blocks 116, such that when the wedges 124 are driven into the wedge cavities 122 along the normal axis of the support tool 110, the blocks 116 are driven in a direction parallel to the surface of the support tool 110 to compact the component preform 106 within the respective component mould 114.

In this example, the tool arrangement 100 further comprises an enclosure 126 which is configured to be placed over, and to enclose the plurality of component moulds 114 and the plurality of wedges 124, to further compact the preform assembly 102.

In this example, the driving surfaces 120 of outer most blocks 116 on the support tool 110 (i.e. those at the periphery of the array of component preforms 106) are engaged by a corresponding surface of the enclosure 126, such that when the enclosure 126 is driven in a direction normal to the support tool 110 (i.e. along the normal axis), the outer most blocks 116 are driven parallel to the surface of the support tool 110, towards a centre of the tool arrangement 100.

In this example, the combination of driving the plurality of wedges 124 into respective wedge cavities 122, and driving the enclosure 126 over the wedges 124 and component moulds 114, act together to drive the pairs of blocks 116 in each component mould 114 together to compact each respective component preform 106.

In other examples, there may be no enclosure, such that the compaction of the plurality of moulds is achieved by the wedges alone.

The tool arrangement 100 comprises a retaining tool 128 configured to engage each of the plurality of wedges 124 to retain the wedges 124 in the wedge cavities 122 between the component moulds. In this example, the retaining tool 128 is in the form of a plate which is placed over the top of the plurality of wedges 126, the plurality of component moulds 114 and the enclosure 126. The retaining tool 128 is aligned with the enclosure 126 by aligning cooperating protrusions and recesses on the enclosure 126 and retaining tool 128. In some examples, there may be no retaining tool, or the retaining tool may be configured to engage only some of the wedges.

FIGS. 6-9 show a second example tool arrangement 200 for laying up and compacting a composite preform assembly 202 for the ESS 50 of FIG. 4. The preform assembly 202 for the ESS 50 comprises similar components to the preform assembly 102 for the first example. The preform assembly 202 for the ESS 50 comprises an annular support structure preform 204 (best seen in FIG. 6), which is an inner annulus preform 204 corresponding to the inner annulus 52 of the ESS 50, and an array of component preforms 206 (best seen in FIG. 8), which are stator vane preforms 206 corresponding to the plurality of vanes 56 of the ESS 50, each extending from the support structure preform 204 along respective radial directions and spaced apart along the support structure preform 204.

The preform assembly in this example also comprises an outer annulus preform 207 (best seen in FIG. 8) which is annular, and is concentric with the support structure preform 204. The outer annulus preform 207 corresponds to the outer annulus 54 of the ESS 50. The vane preforms 206 are disposed between the support structure preform 204 and the outer annulus preform 207.

Figure 6:
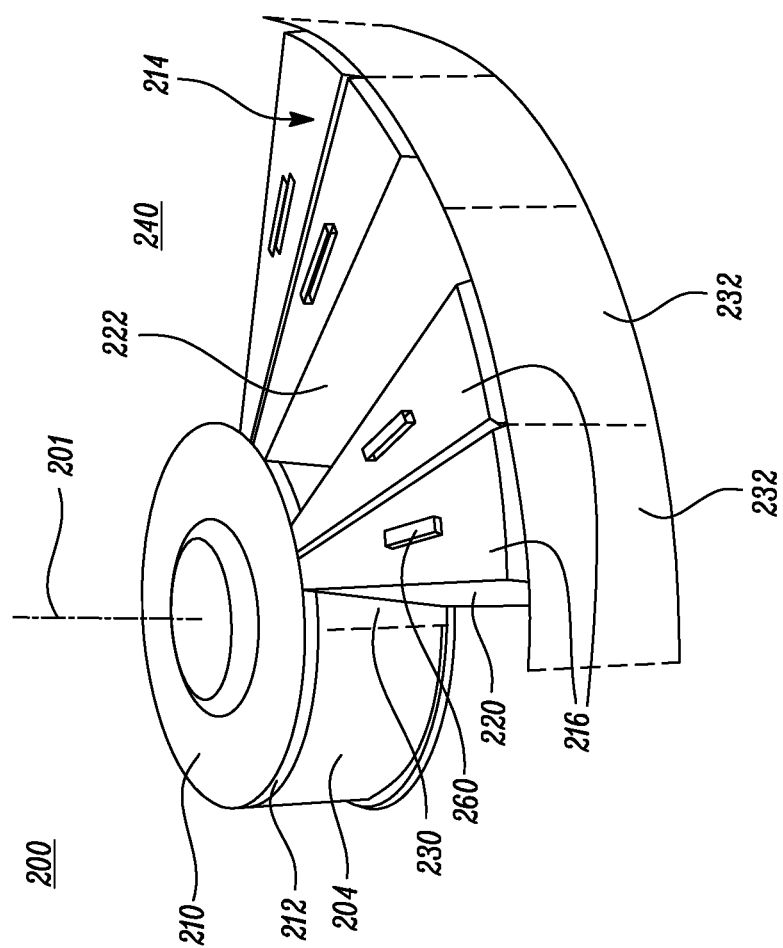
FIG. 6 schematically shows a second example tool arrangement including an inner assembly, and outer assembly and an enclosure.
Figure 7:
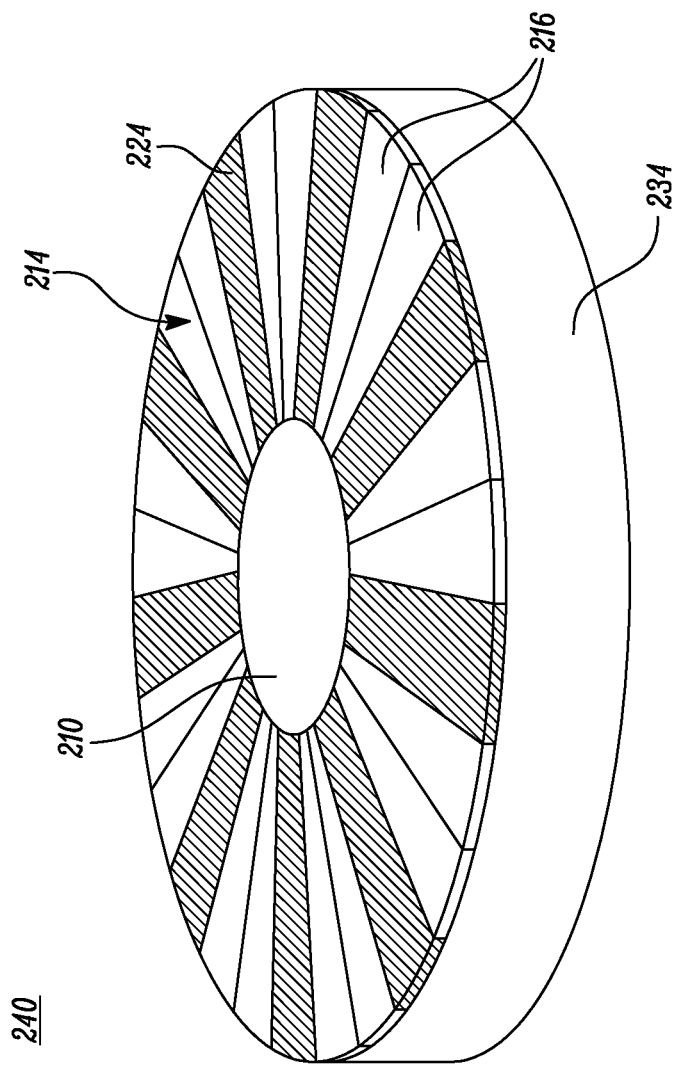
FIG. 7 schematically shows a second example tool arrangement including an inner assembly, and outer assembly and an enclosure.
Figure 9:
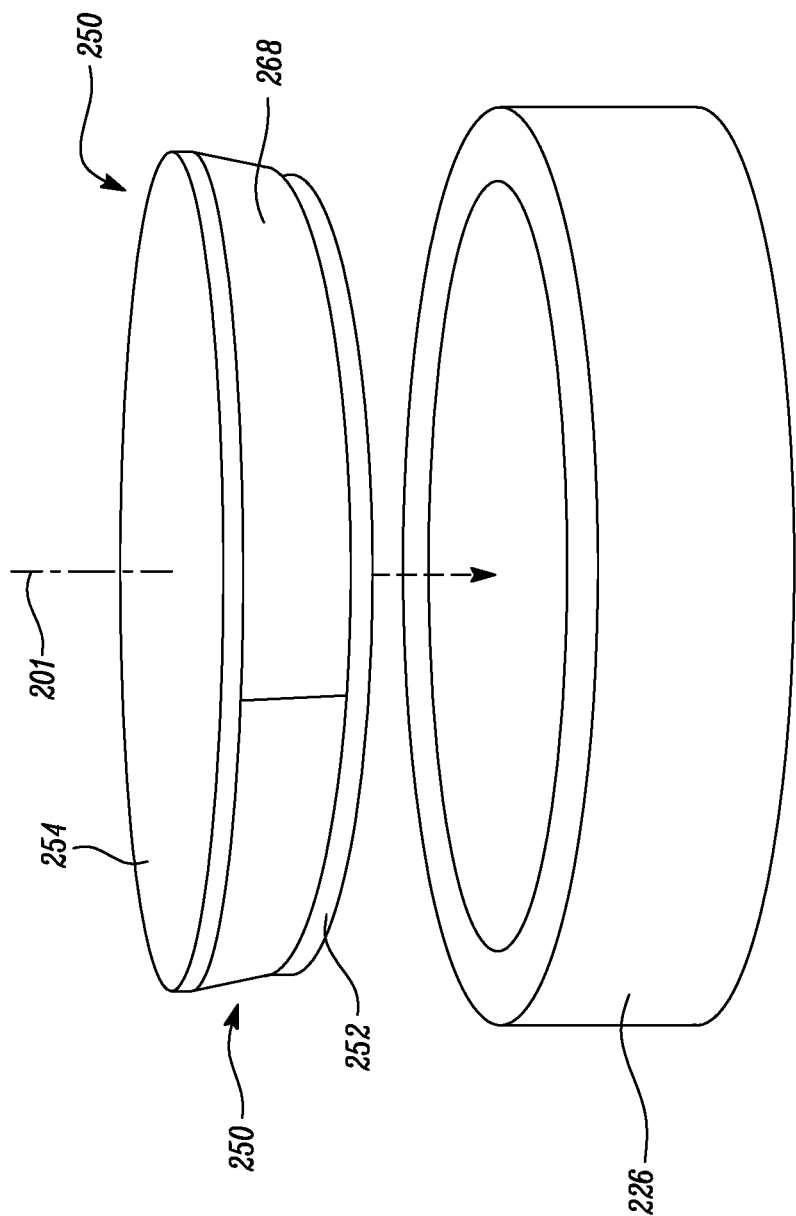
FIG. 9 schematically shows a second example tool arrangement including an inner assembly, and outer assembly and an enclosure.

The tool arrangement 200 comprises an inner assembly 240 (shown in FIGS. 6 and 7), an outer assembly 250 (shown in FIG. 9) and an enclosure 226 (shown in FIG. 9). FIGS. 6 and 7 show the inner assembly 240 of the tool arrangement 200, partially assembled and fully assembled respectively.

The inner assembly 240 comprises a support tool 210, which in this example is a mandrel 210 defining an annular support structure lay-up surface 212 for laying-up the support structure preform 204.

The inner assembly 240 further comprises a plurality of component moulds 214 in the form of vane moulds 214. In this example, there are nine vane moulds 214. In some examples there may be more or fewer vane moulds.

Each of the vane moulds 214 is configured to receive and compact a vane preform 206. Each vane mould 214 comprises a pair of blocks 216, which have similar features to the pair of blocks 116 in the first example. In particular, the pair of blocks 216 are configured to cooperate with one another to receive the vane preform 106, and to compact it. Each of the blocks 216 comprises a compaction surface (not shown) for engaging the vane preform 206, and a driving surface 220 on an external surface of the block 216.

The vane moulds 214 are arranged around the mandrel 210 to be circumferentially spaced around the mandrel 210. The vane moulds 214 are arranged such that the vane preforms 206 extend radially from the inner annulus preform 204, and so that a plurality of wedge cavities 222 are formed between adjacent vane moulds 214. The driving surfaces 220 of adjacent vane moulds 214 are non-parallel. In this example, the driving surfaces 220 are non-parallel so as to define a draft angle with respect to a longitudinal axis 201 of the mandrel 210.

The inner assembly 240 of the tool arrangement 200 further comprises a plurality of wedges 224 (shown in FIG. 7). The wedges 224 are configured to be received in the wedge cavities 222 between the vane moulds 214, and the wedges 224 are configured to cooperate with the driving surfaces 220 of the vane moulds 214 to drive adjacent blocks 216 to compact the respective vane preforms 206. The wedges 224 comprise external surfaces with corresponding draft angles to the blocks 216, such that when the wedges 224 are driven into the wedge cavities 222 along the longitudinal axis 201 of the mandrel 210, the blocks 216 are driven in respective circumferential directions to compact the vane preform 206 within the respective vane mould 214.

When fully assembled, as shown in FIG. 7, the inner assembly 240 comprises a radially outer lay-up surface 234 having an annular profile. The outer lay-up surface 234 is defined by a radially outer surface of the vane moulds 214 and the wedges 224. FIG. 7 shows the outer lay-up surface 234 overlaid with composite material corresponding to bifurcated flanges from the vane preforms 206, as will be further described below.

The vane preform 206 in this example extends out of an inner radial end of the vane mould 214 and an outer radial end of the vane mould 214. A part of the vane preform 206 which extends from the inner radial end of the vane mould 214 is bifurcated to form two inner flanges 230 which are laid up against the mandrel 210, and compacted between the mandrel 210 and the vane moulds 214 and wedges 224.

In use, a part of the vane preform 206 which extends from the outer radial end of the vane mould 214 is bifurcated to form two outer flanges 232, which are laid-up against the outer lay-up surface 234. In this example, the inner flanges 230 and the outer flanges 232 of adjacent vane preforms 26 join up on the support lay-up surface 212 and the outer lay-up surface 234 respectively. In some examples, there may be no inner flanges or no outer flanges at all. In other examples, the inner flanges or the outer flanges may be smaller and may not join up on the respective lay-up surfaces.

Figure 8:
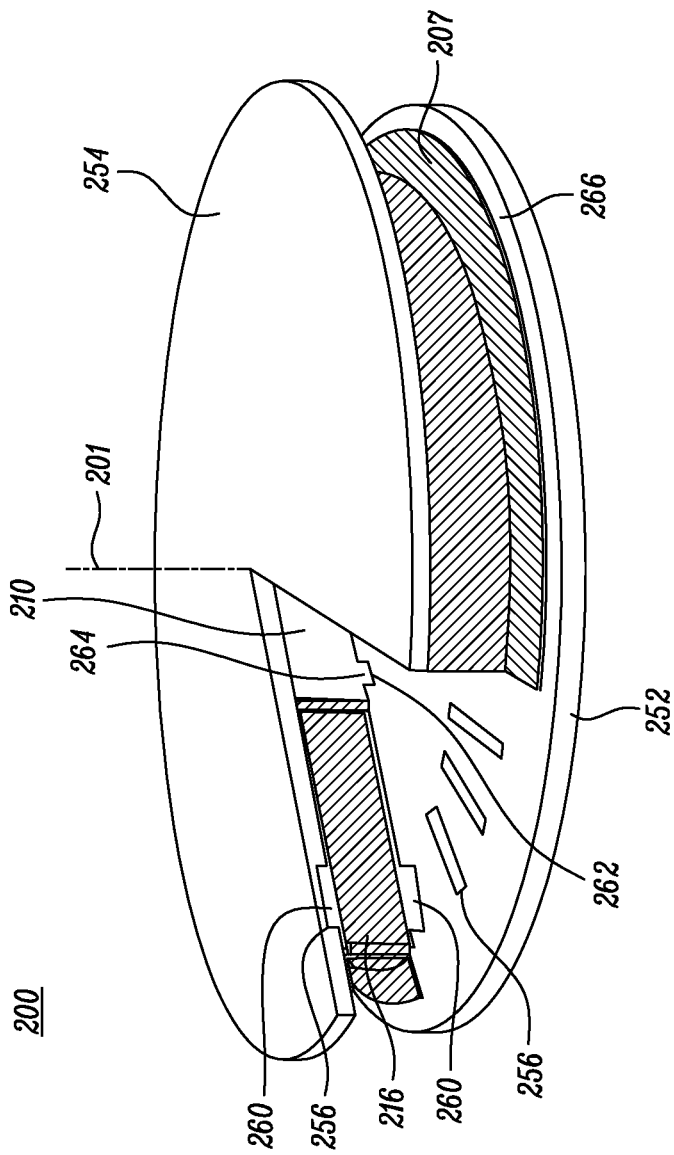
FIG. 8 schematically shows a second example tool arrangement including an inner assembly, and outer assembly and an enclosure.

FIGS. 8 and 9 shows a further stage of assembly of the tool arrangement 200, in which the outer assembly 250 cooperates with the inner assembly 240. FIG. 8 shows a cutaway perspective view of part of the outer assembly 250 enclosing the inner assembly 240.

The outer assembly 250 comprises a first side plate 252 and a second side plate 254. The first and second side plate 252, 254 are configured to sandwich the inner assembly 240, about the longitudinal axis 201 of the mandrel 210.

The first and second side plates 252, 254 act as a retaining tool to engage the plurality of wedges 224 to retain them between the vane moulds 214.

In this example, the mandrel 210 is configured to be placed on the first side plate 252 such that the longitudinal axis 201 of the mandrel 210 is parallel with the normal of the first side plate 252. The first side plate 252 is a circular plate (although other shapes would work) comprising central locating recesses 262. The mandrel 210 comprises locating protrusions 264 which cooperate with the central recesses 262 in the first side plate 252. The mandrel 210 is keyed into the centre of the first side plate 252 by locating the mandrel protrusions 264 into the corresponding first side plate central recesses 262. The locating recesses and protrusions for the mandrel may be configured to prevent lateral movement of the mandrel relative to the side plates.

The first side plate 252 comprises further locating recesses 256, which are configured to cooperate with locating protrusions 260 on the blocks 216 and wedges 224 (also shown in FIGS. 6 and 7) to locate the blocks 216 and wedges 224 in the correct positions relative to the mandrel 210 and the first side plate 252.

The locating recesses and protrusions for the moulds may be configured to permit relative circumferential driving movement of the block 216, whereas the recesses and protrusions for the wedges may be configured to prevent circumferential movement of the wedges, or at least to permit less circumferential movement than the blocks.

In some examples, there may be no cooperating protrusions or recesses at all. In other examples, the mandrel, wedges and/or blocks of the vane moulds may comprise recesses and the first side plate may comprise corresponding protrusions.

In this example, the second side plate 254 also comprises similar recesses 256 to the first side plate 252, and the vane moulds 214 and wedges 224 comprise corresponding protrusions 260 to cooperate with the recesses 256 to retain the vane moulds 214 and wedges 224 in the correct positions.

In other examples, the second side plate may also comprise similar central recesses to the first side plate, or may comprise no recesses at all.

The first and second plates 252, 254 extend beyond the inner assembly to define a flange lay-up surface 266 which is contiguous with the outer lay-up surface 234 of the inner assembly 240.

FIG. 8 shows the outer annulus preform 207 having an annular spine which is laid-up on the outer lay-up surface 234 of the inner assembly 240, and flanges extending radially outward from the spine, and laid-up on the flange lay-up surfaces 266 of the first and second side plate 252, 254.

FIG. 9 shows a perspective view of the whole outer assembly 250 enclosing the inner assembly 240, and an enclosure 226.

The outer assembly 250 further comprises a plurality of semi-annular segments 268 which are configured to oppose the outer lay-up surface 234 to compact the outer annulus preform 207. In this example, there are three semi-annular segments 268 (only two are shown) which fit between the first and second side plates 252, 254, around the whole annulus of the inner assembly 240. When assembled, the first and second side plates 252, 254 sandwich the semi-annular segments 268 so as to accommodate and compact the flanges of the outer annulus preform 207 between the semi-annular segments 268 and the side plates 252, 254. Semi-annular is intended to mean at least partially annular. Therefore, in some examples, there may be more semi-annular segments 268 which encompass the whole inner assembly, or there may be fewer, such as only a single annular segment which encompasses the whole inner assembly.

The outer assembly 250 therefore fully encloses the inner assembly 240. The first and second side plate 252, 254 and the semi-annular segments 268 together form a frustoconical shape, such that an outer surface of the outer assembly 250 comprises a draft angle with respect to the longitudinal axis of the mandrel 201.

The inner assembly 240 and outer assembly 250 are placed within an enclosure 226 (shown by the arrow in FIG. 9). The enclosure 226 comprises a draft angle corresponding to the draft angle of the outer assembly 250, such that the enclosure 226 is configured to cooperate with the outer assembly 250 to provide further compaction to the composite preform assembly 202 by driving and retaining the semi-annular segments 268 between the first and second side plates 252, 254.

In this example, the mandrel 210 and the wedges 214 comprise aluminium, and the enclosure 226 comprises steel. During manufacturing, the tool arrangement 200 may be placed in an autoclave to cure the composite preform assembly by applying heat and pressure. Aluminium has a higher coefficient of thermal expansion than steel, and therefore, when the tool arrangement 200 is heated, the mandrel 210 and wedges 214 expand more than the enclosure 226, such that the expansion of the wedges 214 and mandrel 210 relative to the enclosure 226 provides further compaction of the composite preform assembly 202.

In other examples, the mandrel and wedges may comprise any material having a higher coefficient of thermal expansion than the material of the enclosure. In some examples, only the mandrel or only the wedges may comprise a different material to the enclosure, and in yet other examples, the mandrels, wedges and enclosure may comprise the same material. Materials may be chosen based on temperature requirements during manufacturing.

Figure 10:
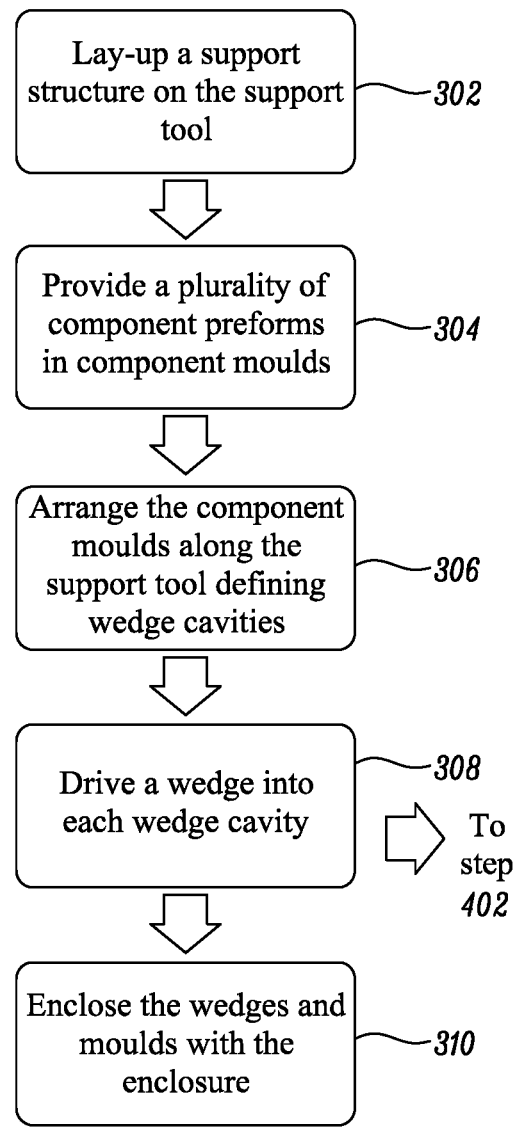
FIG. 10 flow charts showing steps of a method of laying-up and compacting a composite preform assembly using the tool arrangements.
Figure 11:
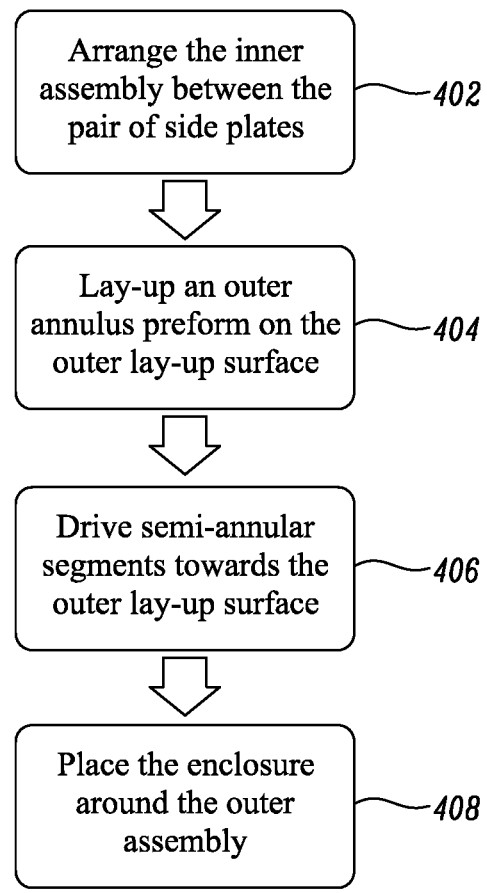
FIG. 11 flow charts showing steps of a method of laying-up and compacting a composite preform assembly using the tool arrangements.

FIGS. 10 and 11 are flow charts showing steps of a method of assembling and compacting a composite preform assembly using a tool arrangement, such as the first example tool arrangement 100 described with reference to FIG. 5, and the second example tool arrangement 200 described with reference to FIGS. 6-9.

FIG. 10 details the steps of the initial method of compacting using a tool arrangement 100, 200.

The method begins with block 302 comprising laying up a support structure preform 104, 204 on the support tool 110, 210.

In block 304, the method comprises providing a plurality of component preforms 206 in respective component moulds 114, 214. The component preforms 206 may be laid-up in the component moulds (i.e. in one of the blocks), or they may be laid-up elsewhere and placed in the moulds.

In block 306, the method comprises arranging the plurality of component moulds 114, 214 comprising component preforms 106, 206 along the support tool 110, 210 so as to define wedge cavities 122, 222 between adjacent component moulds 114, 214. The preforms and moulds may be positioned separately.

In block 308, the method comprises driving the plurality of wedges 124, 224 into respective wedge cavities 122, 222 to as to drive the blocks 116, 216 of the component moulds 114, 214 together to compact the component preforms 106, 206.

If the tool used is a tool arrangement such as the first example tool arrangement 100, then the method proceeds to block 310. Block 310 comprises enclosing the wedges 122 and the component moulds 114 with the enclosure 126 and retaining tool 128 to further compact the preform assembly 102 comprising the support structure preform 104 and the component preforms 106.

However, if the tool used is a tool arrangement such as the second example tool arrangement 200 then the method proceeds from block 308 to block 402 in FIG. 11 which will be described with respect to laying up and compacting the composite preform assembly 202 for the ESS 50.

The method in block 402 comprises arranging the inner assembly 240 (comprising the support structure preform 204 and the component preforms 206 (i.e. vane preforms 206) between the first and second side plates 252, 254.

The method in block 404 comprises laying-up an outer annulus preform 207 having flanges on the outer lay-up surface 234, where the flanges are laid-up on the flange lay-up surfaces of the first and second side plates 252, 254.

As will be appreciated, the inner assembly 240 may have been provided on at least one of the side plates at a previous step of the method, for examples the mandrel may be provided on a side plate when the inner annulus (i.e. support structure preform) is laid-up on the mandrel.

Block 406 of the method comprises driving the semi-annular segments 268 towards the outer lay-up surface 234, between the first and second side plates 252, 254 to compact the outer annulus preform 207 against the outer lay-up surface 234, and the first and second side plates 252, 254.

Block 408 comprises placing the enclosure 226 around the outer assembly 250 in the same manner as in block 310, to further compact the composite preform assembly 202.

On compaction of the preform assembly 102, 202 from either method, the whole tool arrangement 100, 200 comprising the composite preform assembly 102, 202 can be placed in an autoclave, or otherwise heated and pressurised to cure the composite preform assembly 102, 202. In other examples, there may be an additional plate configured to be placed over the enclosure and the side plate, so as to fully enclose the inner assembly and outer assembly within the enclosure and the additional plate. The assembly may be pressurised by placing it in a press for pressing the additional plate against the enclosure.

Although only the second example has been described as having cooperating protrusions and recesses for aligning parts of the tool arrangement, it should be appreciated that these cooperating protrusions and recesses could also be applied to the same or corresponding parts of the tool arrangement in the first example.

Although it has been described that the tooling in the second example is configured to manufacture an engine stator section, it will be appreciated that the tooling may be used to manufacture any "cartwheel" type geometry including an outlet guide vane, an intermediate case, or for a front frame structure.

Although it has been described that the composite preform assembly comprises pre-impregnated fibre reinforcement material and is placed in an autoclave to cure, in other examples where the composite preforms comprise dry fibre reinforcement material, the composite preform assembly may be impregnated with resin by resin transfer moulding, and then cured.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A tool arrangement for compacting a composite preform assembly comprising a support structure preform and an array of component preforms each extending from the support structure preform and spaced apart along the support structure preform, the tool arrangement comprising:
   a support tool defining a lay-up surface for laying up the support structure preform;
   a plurality of component moulds, each component mould comprising a pair of blocks configured to cooperate with one another to receive and compact a respective component preform extending from the support structure therebetween, each block having a compaction surface for engaging the component preform and a driving surface, wherein the component moulds are arranged along the support tool so that a plurality of wedge cavities are defined between non-parallel driving surfaces of adjacent component moulds; and
   a plurality of wedges configured to be received in the wedge cavities and to cooperate with the respective driving surfaces of the component moulds to drive the adjacent blocks to compact respective component preforms,
   wherein the support tool is a mandrel that extends circumferentially about an axis and is configured for laying up the support structure preform annularly about the axis and each component preform extends axially relative to the axis between a proximal end coupled to the support structure preform and a distal end, and
   wherein the component moulds are configured to be circumferentially spaced around the mandrel relative to the axis to compact each component preform at circumferentially spaced positions around the mandrel and each pair of blocks included in each of the plurality of component moulds are engaged at an axially distal end of the pair of blocks to encapsulate the distal ends of the respective component preform included in the array of component preforms.

2. The tool arrangement as claimed in claim 1, further comprising an enclosure configured to be placed over the plurality of component moulds and the plurality of wedges, to further compact the component preforms.

3. The tool arrangement as claimed in claim 2, wherein the wedges comprise a first material and the enclosure comprises a different second material, and wherein the first material has a higher coefficient of thermal expansion than the second material.

4. The tool arrangement as claimed in claim 2, further comprising an outer assembly enclosing at least the plurality of component moulds and the plurality of wedges, wherein an outer surface of the outer assembly comprises a draft angle extending from an axial upper end of the outer assembly to an axial lower end of the outer assembly, and wherein the enclosure comprises a draft angle extending from an axial upper end of the enclosure to an axial lower end of the enclosure corresponding to the draft angle of the outer assembly so that the enclosure cooperates with the outer assembly to provide compaction of the array of component preforms, wherein the axial upper end of the outer assembly is axially aligned or axially lower of the axial upper end of the enclosure, and the axial lower end of the outer assembly is axially aligned or axially upward of the axial lower end of the enclosure.

5. The tool arrangement as claimed in claim 3, wherein the first material comprises aluminium, and wherein the second material comprises steel.

6. The tool arrangement as claimed in claim 1, wherein the support tool and the component moulds have cooperating protrusions and recesses for alignment of the component moulds with respect to the support tool.

7. The tool arrangement as claimed in claim 1, further comprising a retaining tool configured to engage at least some of the plurality of wedges to retain the wedges between the moulds.

8. The tool arrangement as claimed in claim 7, wherein the retaining tool is a plate placed over the plurality of wedges.

9. The tool arrangement as claimed in claim 1, wherein the mandrel comprises a first material and the enclosure comprises a different second material, and wherein the first material has a higher coefficient of thermal expansion than the second material.

10. The tool arrangement as claimed in claim 1, wherein the component moulds and the wedges are configured to define a radially outer lay-up surface when assembled together around the mandrel, the outer lay-up surface having an annular profile for laying up an outer annulus preform.

11. The tool arrangement as claimed in claim 1, further comprising an outer assembly configured to cooperate with an inner assembly comprising the mandrel, the plurality of wedges and the plurality of component moulds, the outer assembly comprising a semi-annular segment configured to oppose the outer lay-up surface to compact an outer annulus preform laid-up on the outer lay-up surface.

12. The tool arrangement as claimed in claim 11, wherein the outer assembly further comprises two cooperating side plates which are configured to sandwich the inner assembly.

13. The tool arrangement as claimed in claim 12, wherein at least one of the side plates defines a flange lay-up surface contiguous with the outer lay-up surface for laying up an outer annulus pre-form comprising a flange, and wherein the side plates are configured to sandwich the semi-annular segment, so as to compact the flange in the outer annulus preform against the semi-annular segment.

14. The tool arrangement as claimed in claim 13, wherein the outer assembly comprises a draft angle with respect to a longitudinal axis of the mandrel, and wherein the tool arrangement further comprises an enclosure having a corresponding draft angle which is configured to cooperate with draft angle of the outer assembly so as to provide further compaction to the preforms.

15. The tool arrangement as claimed in claim 12, wherein one, or both of the side plates, and the component moulds comprise cooperating protrusions and recesses for alignment of the moulds with respect to the side plates.

16. A method of compaction of a composite preform assembly comprising a support structure preform and an array of component preforms each extending from the support structure preform and spaced apart along the support structure preform and using a tool arrangement as claimed in claim 1, the method comprising:
 laying up a support structure preform on the support tool;
 laying up a plurality of component preforms in respective component moulds;
 arranging the moulds in spaced arrangement along the support structure preform such that the component preforms extend from the support structure preform, and to define the plurality of wedge cavities between non-parallel driving surfaces of adjacent component moulds; and
 driving a wedge into each wedge cavity between respective pairs of component moulds to compact the component preforms in the moulds.

17. The method as claimed in claim 16, the method comprising laying up an outer annulus preform on a radially outer lay-up surface defined by the wedges and the component moulds, after driving the wedges into the wedge cavities.

18. The method as claimed in claim 17, comprising driving semi-annular segments of an outer assembly towards the outer lay-up surface, to compact the outer annulus preform.

19. The method as claimed in claim 16, comprising arranging an inner assembly comprising the support tool, the component moulds and the wedges in between a pair of side plates of the outer assembly.

20. The method as claimed in claim 18, comprising placing an enclosure around at least the inner assembly to further compact the component preforms, and the support structure preform.

* * * * *